(12) United States Patent
Hayashide (10) Patent No.: US 7,021,541 B2
(45) Date of Patent: Apr. 4, 2006

(54) ORIGINAL ILLUMINATING APPARATUS AND IMAGE READER HAVING THE SAME

(75) Inventor: Tadao Hayashide, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/330,267

(22) Filed: Dec. 30, 2002

(65) Prior Publication Data

US 2003/0137751 A1    Jul. 24, 2003

(30) Foreign Application Priority Data

Jan. 22, 2002   (JP) .............................. 2002-012563

(51) Int. Cl.
*G06K 7/10*   (2006.01)

(52) U.S. Cl. ................. 235/454; 235/462.42; 235/473; 355/70; 359/201; 359/202

(58) Field of Classification Search ................ 235/454, 235/459, 462.14, 462.32, 472.03; 355/68, 355/67, 70; 358/509
See application file for complete search history.

(56) References Cited

U.S. PATENT DOCUMENTS

| | | | |
|---|---|---|---|
| 3,787,702 A * | 1/1974 | Hujer et al. ................. | 235/454 |
| 3,838,921 A * | 10/1974 | Sargis ........................ | 399/129 |
| 3,947,115 A * | 3/1976 | Hamaguchi ................. | 399/218 |
| 4,766,300 A * | 8/1988 | Chadima et al. ........ | 235/462.21 |
| 4,935,767 A * | 6/1990 | Sangyoji et al. .............. | 355/20 |
| 5,287,147 A * | 2/1994 | Fukasawa et al. .......... | 399/211 |
| 5,291,009 A * | 3/1994 | Roustaei ................ | 235/462.42 |
| 5,539,444 A * | 7/1996 | Ikeda et al. .................. | 347/241 |
| 5,625,436 A * | 4/1997 | Yanagihara et al. .......... | 355/53 |
| 6,026,216 A * | 2/2000 | Ohtsuka et al. .............. | 358/1.9 |
| 6,437,816 B1* | 8/2002 | Fujita et al. ................. | 347/233 |
| 6,462,866 B1 | 10/2002 | Sugiyama et al. .......... | 359/359 |
| 6,462,879 B1* | 10/2002 | Masuda ...................... | 359/626 |
| 6,493,061 B1 | 12/2002 | Arita et al. ................... | 355/41 |

FOREIGN PATENT DOCUMENTS

JP            10193675 A   *   7/1998

* cited by examiner

*Primary Examiner*—Uyen-Chau N. Le
(74) *Attorney, Agent, or Firm*—Fitzpatrick, Cella, Harper & Scinto (57) ABSTRACT

The invention aims at obtaining an original illuminating apparatus and an image reader having the same with which "the reflection" phenomenon is reduced, and much quantity of light for illumination is obtained in an area to be read of an original to thereby be able to perform the reading operation at high speed. In order to attain the above object, an original illuminating apparatus for illuminating image information for use in an image reader for imaging the image information on a reading unit through a reading lens to read the image information in accordance with the line sequential method includes a plurality of tubular light sources arranged in column style and having the spectral characteristics of substantially the same color which are arranged on one side of the spaces obtained by partitioning thereinto the whole space lying below an original stage glass member with a plane including a main scanning direction and a plane perpendicular to that plane such that parts of their tube diameters overlap one another in an optical axis direction.

8 Claims, 6 Drawing Sheets

ORIGINAL ILLUMINATING APPARATUS AND IMAGE READER HAVING THE SAME

BACKGROUND OF THE INVENTION

1. Field of the Invention

The present invention relates in general to an original illuminating apparatus and an image reader having the same. In particular, the invention is suitable for an apparatus, for use in digital copying machines, image scanners, multifunction printers or the like, for illuminating efficiently an original (image information) with high illuminance to read image information of the original at high speed.

2. Related Background Art

Figure 5:
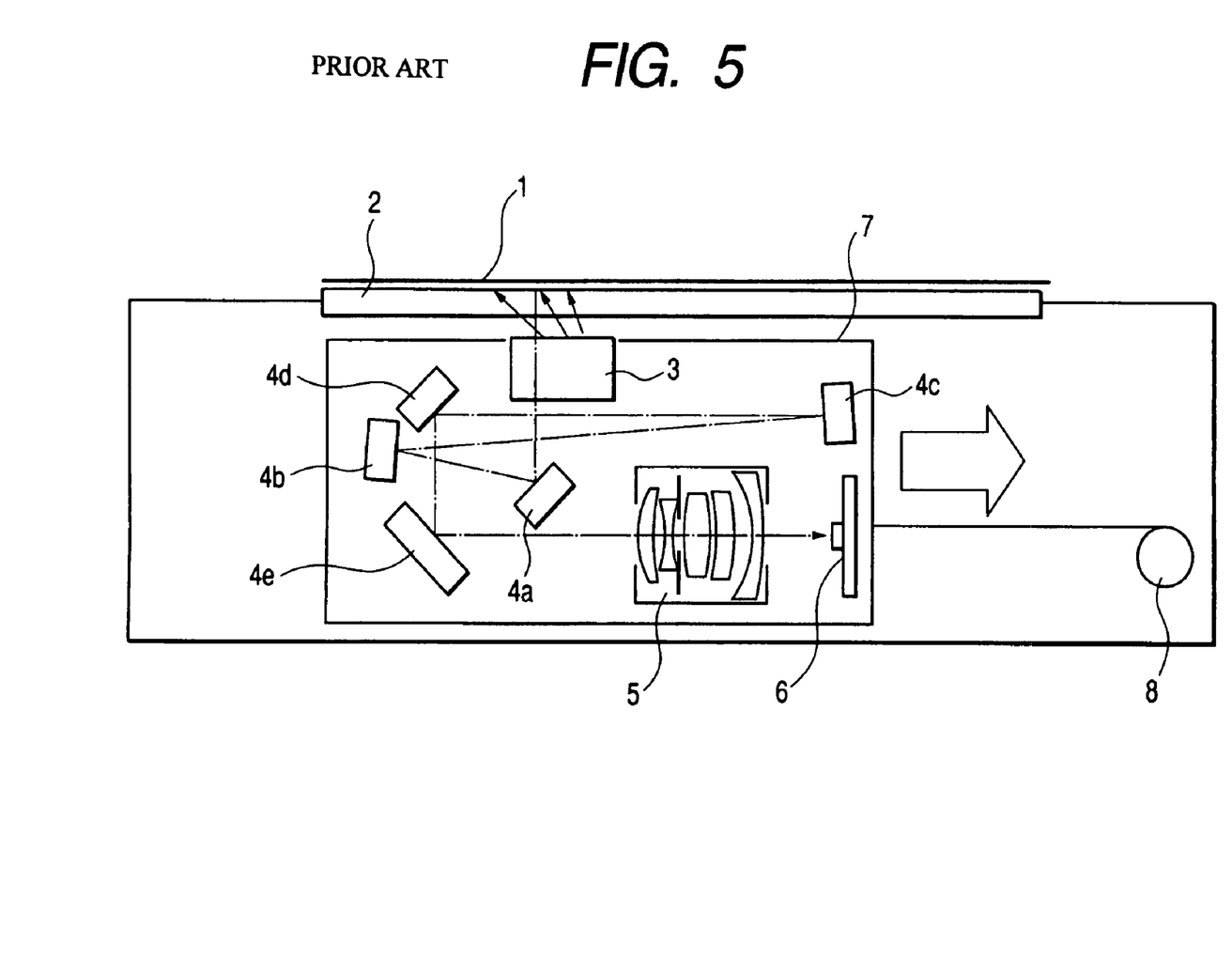
FIG. 5 is a schematic view showing the construction of a main portion of an image reader employing a conventional original illuminating apparatus.

FIG. 5 is a schematic diagram showing the construction of a main portion of a conventional image reader.

In FIG. 5, reference numeral 2 designates an original stage glass member on which an original 1 is to be placed. Reference numeral 7 designates a carriage in which an original illuminating apparatus 3 for illuminating the original 1 which will be described later, reflecting mirrors 4a to 4e, an imaging lens 5 and a reading unit or reading means 6 are integrally accommodated. Then, the carriage 7 is scanned in a sub-scanning direction in the figure with a sub-scanning mechanism 8 such as a motor to read successively image information of the original 1.

The image information thus read is sent to a personal computer or the like as an external apparatus through an interface (not shown).

The luminous flux which has been obtained by reflecting light from the original 1 by the reflecting mirrors 4a to 4e is optically folded in the inside of the carriage 7. The imaging lens 5 is adapted to image the light from the original 1 on the reading unit (CCD) 6 which will be described later. The CCD (Charge Coupled Device) linear sensor 6 as the reading unit is constructed such that a plurality of light receiving elements are arranged in a main scanning direction as a direction perpendicular to the paper.

Along with the promotion of high speed operation of personal computers in recent years, the image scanners which can be operated at high speed have been greatly demanded from the market. In addition, in the digital copying machines as well, the demand for the high speed machines has been increased. Thus, under the circumstances, the necessity for promoting the high speed operation of the image readers has been increased.

In the above-mentioned construction, for the promotion of the high speed operation of the image readers, it is necessary to increase a quantity of light reaching the CCD 6. While in order to attain this, there is conceivable a method of improving reflectivity of the mirrors 4a to 4e and brightness of the imaging lens 5, almost mirrors have already reflectivity of about 95%, and hence a large improvement on the reflectivity is not expected. In addition, if brightness of the imaging lens 5 is doubled, then the lens structure becomes complicated, and the increase of about three or more times in cost is necessarily estimated.

Figure 6:
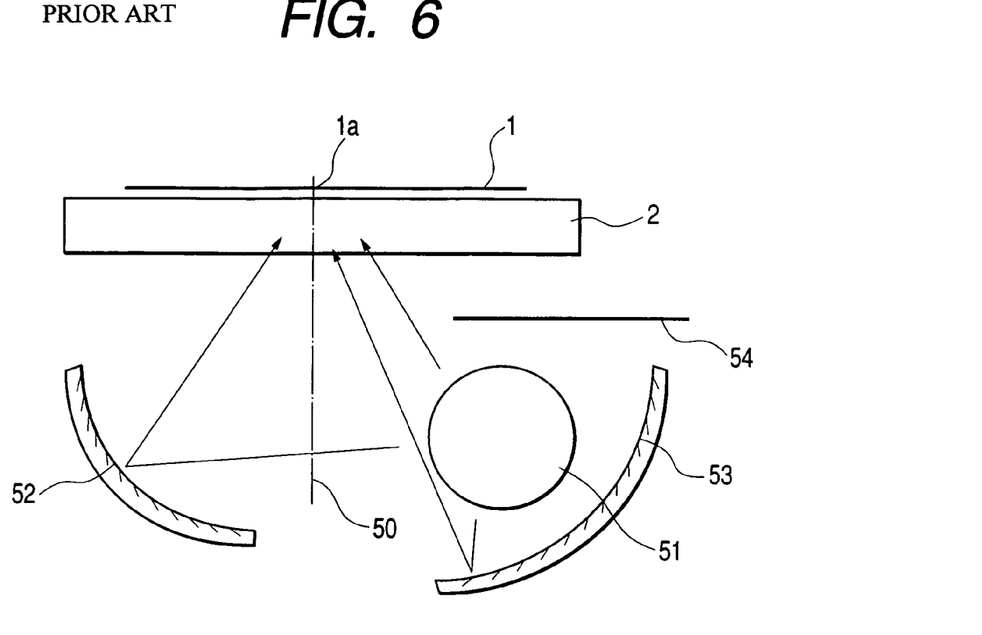
FIG. 6 is a schematic view showing the construction of a main portion of a conventional original illuminating apparatus.

Then, the necessity of increasing a quantity of light for illumination by the improvement on the original illuminating apparatus 3 has been increased. The description will hereinbelow be given with respect to the details of the original illuminating apparatus 3 for use in the conventional image reader shown in FIG. 5. FIG. 6 is a schematic view showing the construction of an example of a main portion of the conventional original stage glass member 2 and original illuminating apparatus.

A tubular light source 51 such as a cold cathode tube or an Xe gas tube illuminates an area 1a to be read of the original 1 placed on the original stage glass member 2 with assistance of a combination of reflecting plates 52 and 53 which are arranged across an optical axis 50 of the imaging lens 5 from each other, i.e., which are respectively arranged on the opposite side and rear face side of the tubular light source 51.

A light shielding plate 54 is arranged between the tubular light source 51 and the original stand glass member 2. Almost light which is emitted towards an area other than the area 1a to be read on the original 1 can be blocked off by the light shielding plate 54. Thus, the light shielding plate 54 is adapted to reduce a quantity of light, which is directly incident on the CCD 6, or incident on the area 1a to be read after having been diffusedly reflected by the original stage glass member 2 and other members.

Only one tubular light source 51 is provided in this prior art, and hence in order to enhance the illumination efficiency, the positions and shapes of the reflecting plates 52 and 53 are optimized. However, as described above, the higher speed operation is required, and hence it is necessary to increase a quantity of light all the more.

Figure 7:
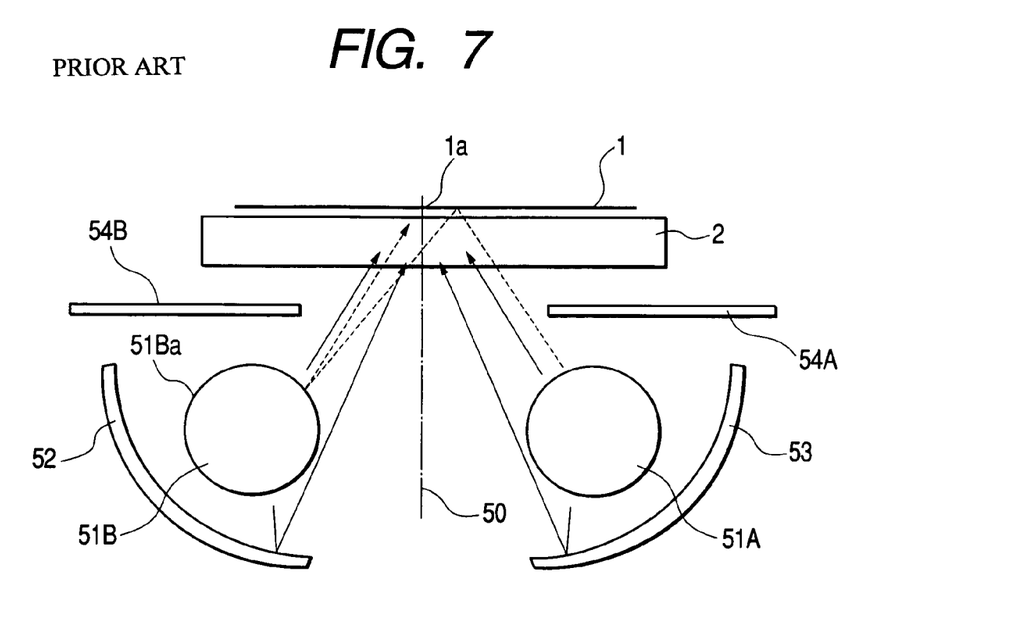
FIG. 7 is a schematic view showing the construction of a main portion of another conventional original illuminating apparatus.

FIG. 7 is a schematic view showing the construction of a main portion of a second prior art of the original stage glass member 2 and the original illuminating apparatus.

In the prior art shown in FIG. 7, two tubular light sources each shown in FIG. 6, i.e., tubular light sources 51A and 51B and rear side reflecting plates 52 and 53 are arranged across or both sides of the reading optical axis 50 from each other so as to be symmetrical with respect to the reading optical axis 50. As a result, a quantity of light for illumination that is incident on the area 1a to be read of the original 1 is greatly increased, which makes the high speed reading operation possible.

In the original illuminating apparatus shown in FIG. 7, there occurs "the reflection" phenomenon in which as exemplified with broken lines in the figure, the light which has been emitted from the tubular light source 51A to be reflected in the vicinity of the areas 1a to be read is reflected by a surface 51Ba of the other tubular light source 51B to be incident on the areas 1a to be read again. "The reflection" phenomenon in the original illuminating apparatus shown in FIG. 7 occurs due to the construction in which the tubular light sources 51A and 51B are respectively arranged on the left and right sides so as to be symmetrical with respect to the reading optical axis 50. It is known that if "the reflection" phenomenon occurs, then the concentration of the read image becomes ununiform due to the concentration of the area other than the area 1a to be read so that the image quality is remarkably degraded.

While for blocking-off of the above-mentioned "reflection" phenomenon, the positions of the light shielding plates 54A and 54B which are respectively arranged above the tubular light sources 51A and 51B must be optimized, if the mounting accuracy and the like are taken into consideration, there is the possibility that even the necessary illuminating light is shielded off.

SUMMARY OF THE INVENTION

In the light of the foregoing, the present invention has been made in order to solve the above-mentioned problems associated with the prior art, and it is therefore an object of the present invention to provide an original illuminating apparatus and an image reader having the same with which "the reflection" phenomenon is reduced, and a much quantity of light for illumination is obtained in an area to be read of an original to make the high speed reading operation possible.

In order to attain the above-mentioned object, according to the present invention, there is provided an original illuminating apparatus for illuminating image information for use in an image reader for imaging the image information on image reading means through a reading optical system, the apparatus comprising:

a plurality of tubular light sources extending in a main scanning direction, in which the plurality of tubular light sources are arranged in a direction of a reading optical axis of the reading optical system such that parts of their tube diameters overlap one another in a sub-scanning direction.

In the original illuminating apparatus, it is preferable that for the plurality of tubular light sources, arbitrary two or more light sources or all of the light sources are made to emit light simultaneously to illuminate the original.

Alternatively, in the original illuminating apparatus, it is preferable that a light shielding plate is arranged so as to overlap a part of the tube diameter of at least one light source of the plurality of tubular light sources in the sub-scanning direction.

Alternatively, in the original illuminating apparatus, it is preferable that a reflecting plate for reflecting the luminous flux from the plurality of tubular light sources to the image information side is arranged across the reading optical axis from the plurality of tubular light sources.

Alternatively, in the original illuminating apparatus, it is preferable that a reflecting plate for reflecting the luminous flux from the plurality of tubular light sources to the image information side is arranged across the plurality of tubular light sources from the reading optical axis.

Alternatively, in the original illuminating apparatus, it is preferable that when the tube diameter of the plurality of tubular light sources is D, and a quantity of overlapping between the adjacent two tubular light sources in the sub-scanning direction is N, the following relationship:

$$0.25 < N/D \leq 1.0$$

is satisfied.

Alternatively in the original illuminating apparatus, further including an original stage on which an original as the image information is to be placed, it is preferable that when of the plurality of tubular light sources, the tube diameter of the tubular light source closest to the original stage in the reading optical axis is D, and a quantity of overlapping between the tubular light source concerned and the light shielding plate in the sub-scanning direction is L, the following relationship:

$$0.25 < L/D \leq 1.0$$

is satisfied.

Alternatively, in the original illuminating apparatus, it is preferable that all of the plurality of tubular light sources is arranged on one side with respect to the reading optical axis.

Further, it is preferable that an image reader includes:

the original illuminating apparatus according to a first aspect of the present invention; and a controller adapted to communicate with an external apparatus through an interface.

BRIEF DESCRIPTION OF THE DRAWINGS

The above and other objects are effected by the invention as will be apparent from the following description and claims taken in connection with the accompanying drawings, forming a part of this application, in which:

DESCRIPTION OF THE PREFERRED EMBODIMENTS

The preferred embodiments of the present invention will hereinafter be described in detail with reference to the accompanying drawings.

First Embodiment

Figure 1:
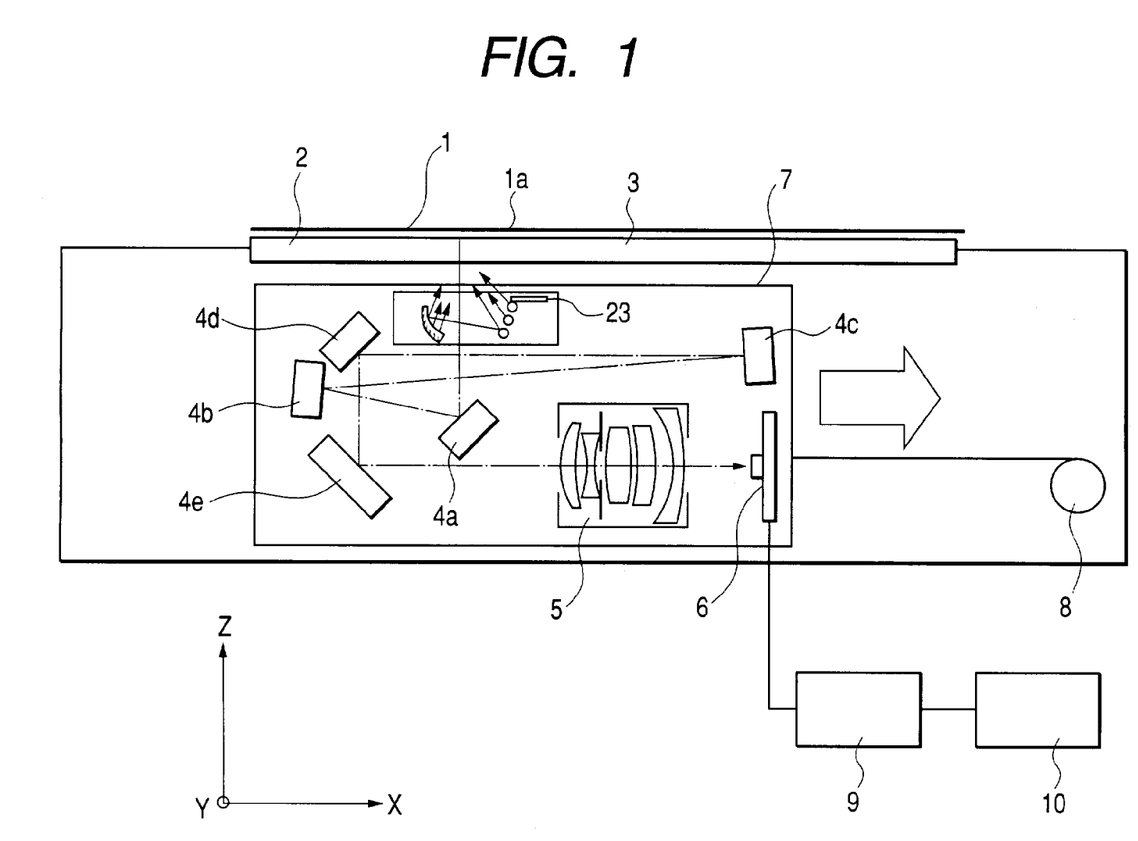
FIG. 1 is a schematic view, partly in block diagram, showing the construction of a main portion of an original reader according to a first embodiment of the present invention.

FIG. 1 is a schematic view, partly in block diagram, showing the construction of a main portion of an image reader according to a first embodiment of the present invention.

In FIG. 1, reference numeral 2 designates an original stage glass member on which an original 1 is to be placed. Reference numeral 7 designates a carriage in which an original illuminating apparatus 3 for illuminating the original 1, reflecting mirrors 4a to 4e, an imaging lens 5 as a reading optical system, and a reading unit or reading means 6 are integrally accommodated. Then, the carriage 7 is scanned in a sub-scanning direction (X direction) in the figure with a sub-scanning mechanism 8 such as a motor to read successively image information of the original 1.

While in the present embodiment, the imaging lens 5 is used as the reading optical system, alternatively, a diffraction optical element, a power reflecting mirror or a free-form surface mirror (FO) may also be available therefor.

The image information thus read is sent to a personal computer 10 or the like as an external apparatus through an interface 9.

The luminous flux, which has been obtained by reflecting light from the original 1 with the reflecting mirrors 4a to 4e, is optically folded. The imaging lens 5 is adapted to image the light from the original 1 on the reading unit (CCD) 6 which will be described later. The CCD (Charge Coupled Device) linear sensor 6 as the reading unit is constructed such that a plurality of light receiving elements are arranged in a main scanning direction (Y direction) as a direction perpendicular to the drawing paper. Note that the direction which is perpendicular to the X-axis and which extends in the upper direction of the paper is assigned to the Z-axis.

Figure 2:
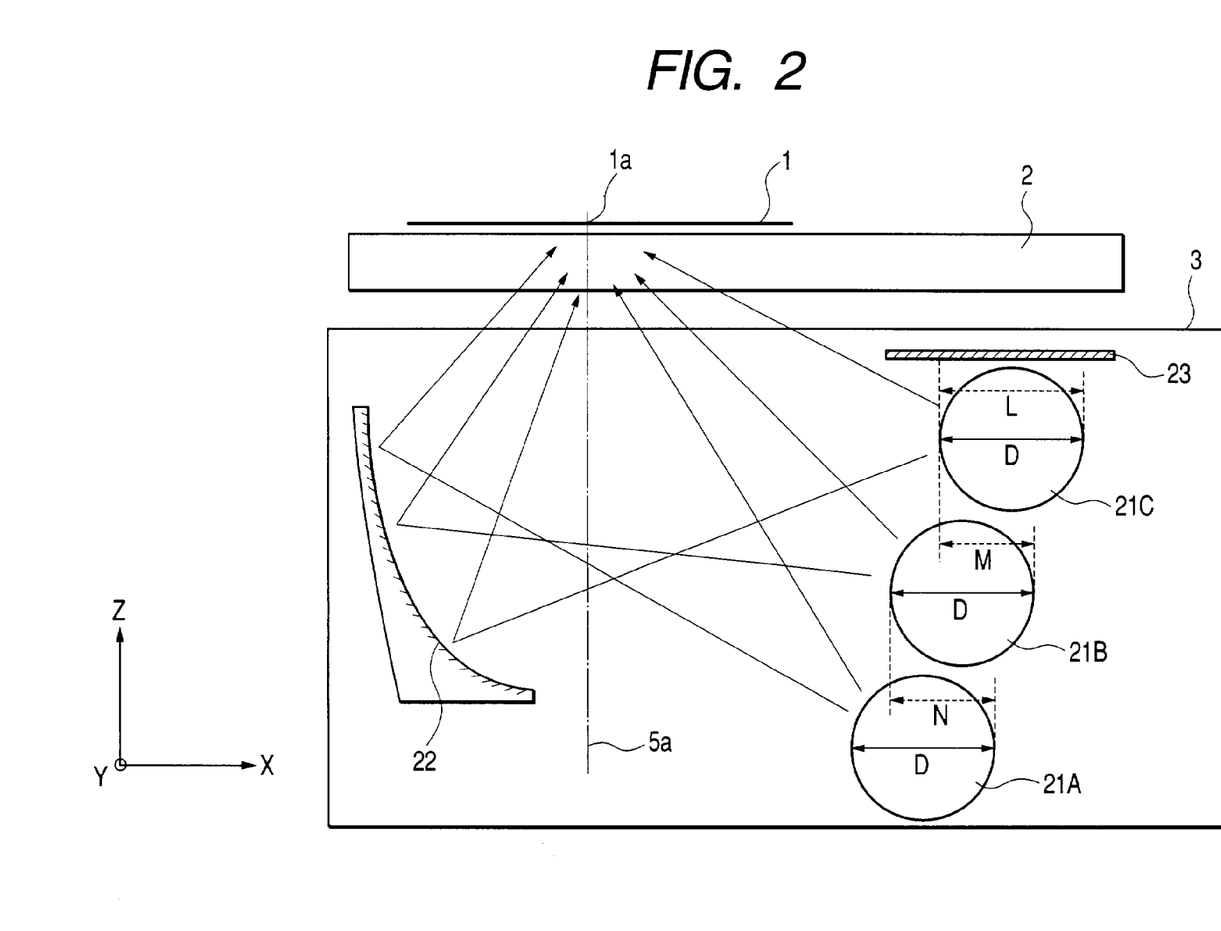
FIG. 2 is a schematic view showing the construction of a main portion of the original reader according to the first embodiment of the present invention.

FIG. 2 is a schematic view of a main portion showing the positional relationship between the original illuminating apparatus 3 used in the image reader shown in FIG. 1 and the original stage glass member 2.

In FIG. 2, reference numerals 21A, 21B and 21C respectively designate tubular light sources which extend in the main scanning direction (hereinafter referred to as "light sources"), and which emit light having the spectral characteristics of substantially the same color.

In the first embodiment, in such a manner, a plurality of light sources 21A to 21C are arranged on one side of the spaces which are obtained by partitioning thereinto the whole space lying below the original stage glass member 2 with a plane (YZ-plane) including an optical axis 5a and parallel with the main scanning direction, and the XY-plane (the plane having the original stage glass member 2 placed thereon).

That is, all of the light sources 21A to 21C are arranged on one side with respect to the reading optical axis 5a of the reading (imaging) lens 5 as the reading optical system. In addition, a reflecting plate 22 is arranged across the optical axis 5a from the light sources 21A to 21C. Note that any number of light sources may be available as long as they are a plural.

In FIG. 2, reference symbol N designates a quantity of overlapping between the light sources 21A and 21B along the optical axis 5a, i,e., a quantity of overlapping therebetween when viewed from the direction of the optical axis 5a, reference symbol M designates a quantity of overlapping between the light sources 21B and 21C along the optical axis 5a, and reference symbol L designates a quantity of overlapping between the light source 21C and the light shielding plate 23 along the optical axis 5a.

Now, if for the light sources 21A to 21C, the light sources having the same tube diameter (diameter D) are employed, for suppression of "the reflection" phenomenon and enhancement of the illumination efficiency, L, M, N and D have to be set so as to meet the following relationship:

$0.25 < N/D \leq 1.0$ $0.25 < M/D \leq 1.0$ $0.25 < L/D \leq 1.0$ (Expression 1).

Moreover, L, M, N and D have to be further preferably set so as to meet the following relationships:

$0.5 < N/D < 0.8$ $0.5 < M/D < 0.8$ $0.5 < L/D < 0.8$ (Expression 2).

In the present invention, if the size of the original is taken into consideration, then the relationships of $1.8 \leq D \leq 12$, $0.4 \leq N \leq 12$, $0.4 \leq M \leq 12$, and $0.4 \leq L \leq 12$ are preferable.

In addition, if the size of the original is taken into consideration, then the length P of each of the tubular light sources extending in the main scanning direction preferably meets the relationship of $220 \leq P \leq 350$.

As described above, in the present embodiment, the light sources 21A to 21C are arranged in a column style substantially along the reading optical axis 5a such that parts of the tube diameters of the light sources 21A to 21C overlap one another in a direction of the optical axis 5a as shown with the overlapping quantities L, M and N in the figure. Thus, the light which has been emitted from the lowermost light source 21A towards the area other than the illumination area 1a is shaded by a part of the tubular light source 21B, the light emitted from the middle light source 21B is shaded by a part of the uppermost tubular light source 21C, and the light emitted from the uppermost light source 21C is shaded by the light shielding plate 23 which is arranged above the uppermost light source 21C. In addition, since all of the light sources 21A to 21C are collectively arranged on one side with respect to the optical axis 5a, "the reflection" phenomenon is also solved which is caused when the light sources are respectively arranged on the both sides so as to be symmetrical with respect to the optical axis.

Of a plurality of light sources, arbitrary two or more light sources or all of the light sources are made simultaneously to emit the light to illuminate the area 1a to be read of the original 1.

In the first embodiment, the light sources 21A to 21C are arranged in such a manner, thereby being able to illuminate the area 1a to be read of the original 1 with high illuminance to read the image information on the original 1 at high speed.

The kind of the original reader is not intended to be limited to the construction shown in FIG. 1, and hence an arbitrary type may be available. For example, the original reader may also be of the type in which the original stage glass member is movable.

Second Embodiment

Figure 3:
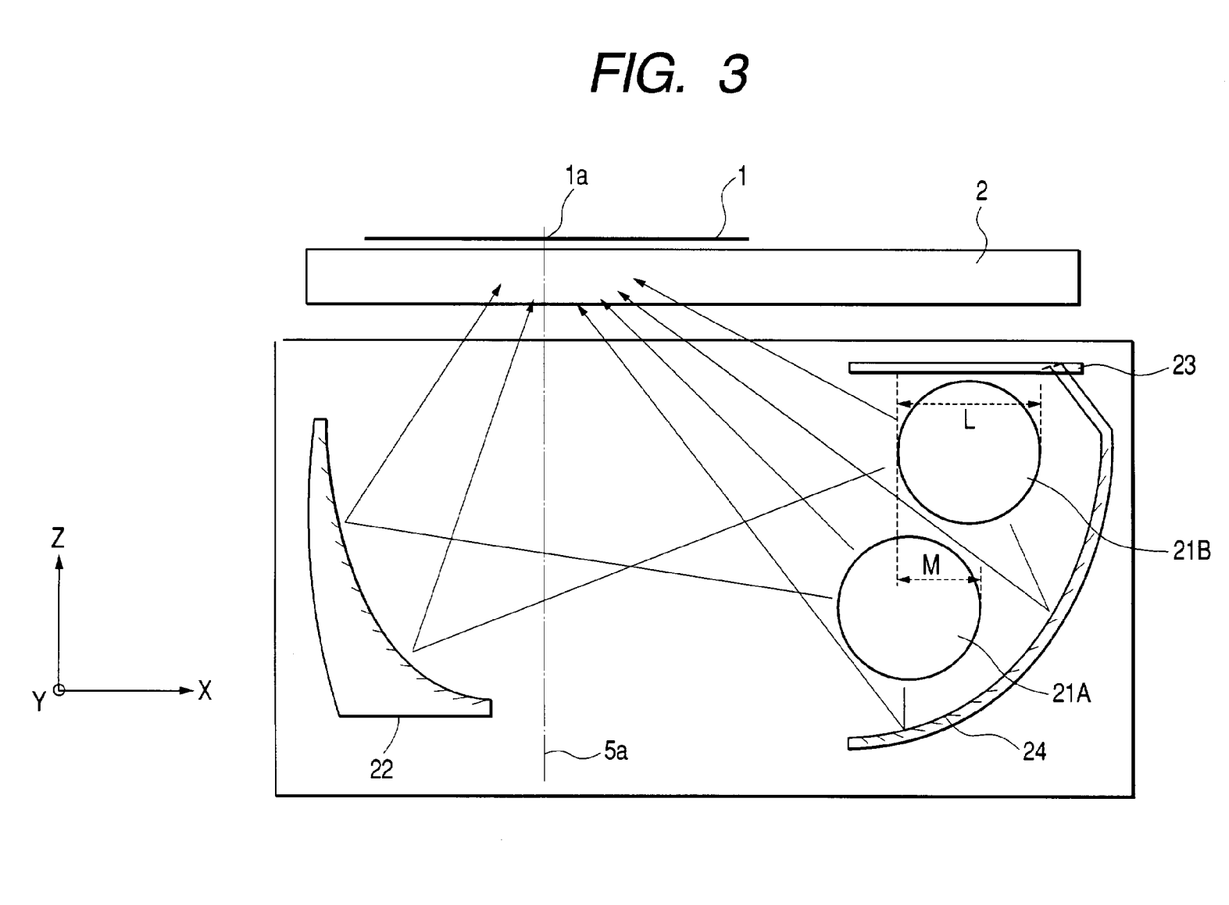
FIG. 3 is a schematic view showing the construction of a main portion of an original reader according to a second embodiment of the present invention.

FIG. 3 is a schematic view showing the construction of a main portion of an original illuminating apparatus according to a second embodiment of the present invention.

Light sources 21A and 21B are arranged on one side of the spaces which are obtained by partitioning thereinto the whole space lying below the original stage glass member 2 with the plane parallel with the main scanning direction (YZ-plane) and including the optical axis 5a, and the XY-plane.

That is, all of the light sources 21A and 21B are arranged on one side of the reading optical axis 5a. A reflecting plate 22 is arranged across the optical axis 5a from the light sources 21A to 21C. A reflecting plate 24 is arranged at the rear side of the light sources 21A and 21B.

The light sources 21A and 21B are arranged in a column style substantially along the optical axis 5a such that parts of the tube diameters of the light sources 21A and 21B overlap each other in a direction of the optical axis 5a as shown with overlapping quantities L and M in the figure. It is preferable that the quantities M and L of overlapping at this time are set similarly to those of the first embodiment. Thus, the light, which has been emitted from the lower light source 21A towards the area other than the illumination area 1a, is shaded by the upper tubular light source 21B, and the light emitted from the upper light source 21B is shaded by the light blocking plate 23 that is arranged above the upper light source 21B. A reflecting plate 24 which is arranged on the rear side of the light sources 21A and 21B has the function of directing the light emitted towards the opposite side of the original 1 to the area 1a to be read and thus is adapted to enhance the illumination efficiency.

Since in the second embodiment as well, similarly to the first embodiment, all of the light sources are collectively arranged on one side with respect to the optical axis 5a, "the reflection" phenomenon is also solved which is caused when the light sources are respectively arranged on the both sides so as to be symmetrical with respect to the optical axis.

Third Embodiment

Figure 4:
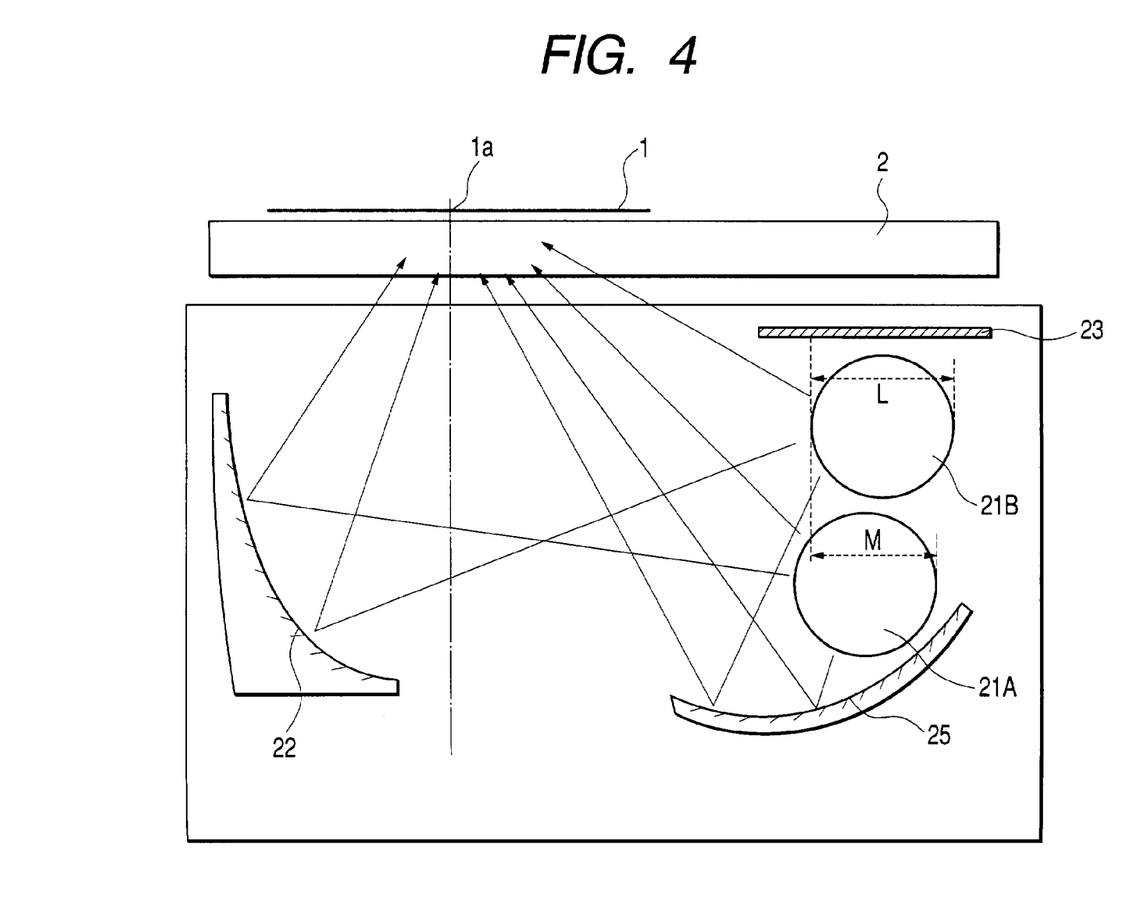
FIG. 4 is a schematic view showing the construction of a main portion of an original reader according to a third embodiment of the present invention.

FIG. 4 is a schematic view showing the construction of a main portion of an original illuminating apparatus according to a third embodiment of the present invention.

Light sources 21A and 21B are arranged on one side of the spaces which are obtained by partitioning thereinto the whole space lying below the original stage glass member 2 with the plane parallel with the main scanning direction (YZ-plane) and including the optical axis 5a, and the XY-plane.

That is, all of the light sources 21A and 21B are arranged on one side of the reading optical axis 5a. A reflecting plate 22 is arranged across the optical axis 5a from the light sources 21A to 21C. A reflecting plate 25 is arranged below the light source 21A.

The light sources 21A and 21B are arranged in a column style substantially along the optical axis 5a such that parts of the tube diameters of the light sources 21A and 21B overlap each other in a direction of the optical axis 5a as shown with overlapping quantities L and M in the figure. It is preferable that the quantities M and L of overlapping at this time are set similarly to those of the first embodiment. Thus, the light that has been emitted from the lower light source 21A towards the area other than the illumination area 1a is shaded by the upper tubular light source 21B, and the light emitted from the upper light source 21B is shaded by the light shielding plate 23, which is arranged above the upper light source 21B. A reflecting plate 24 which is arranged on the lower side of the light source 21A has the function of directing the light emitted towards the opposite side of the original 1 to the area 1a to be read and thus is adapted to enhance the illumination efficiency.

Since in the third embodiment as well, similarly to the first embodiment, all of the light sources are collectively arranged on one side with respect to the optical axis 5a, "the reflection" phenomenon is also solved which is caused when the light sources are respectively arranged on the both sides so as to be symmetrical with respect to the optical axis.

As set forth hereinabove, according to the present embodiment, it is possible to realize an original illuminating apparatus with which "the reflection" phenomenon is reduced, and much quantity of light for illumination is obtained on a face of an original. Also, this makes it possible to realize the high speed operation of an image reader.

As many apparently widely different embodiments of this invention may be made without departing from the spirit and scope thereof, it is to be understood that the invention is not limited to the specific embodiments thereof except as defined in the appended claims.

What is claimed is:

1. An original illuminating apparatus for use in an image reading apparatus to illuminate image information on an original, wherein the image information is imaged on reading means through a reading optical system, and wherein a sub-scanning direction in the image reading apparatus is a direction along which the reading means moves relative to the original, and a main scanning direction is a direction perpendicular to the sub-scanning direction and to a reading optical axis of the reading optical system, the apparatus comprising:

a plurality of tubular light sources extending in the main scanning direction, wherein the plurality of tubular light sources are arranged in a direction of the reading optical axis such that, when viewed from a direction parallel to the reading optical axis, tube diameters of said tubular light sources overlap one another in a sub-scanning direction, and wherein when the tube diameter of the plurality of tubular light sources is D, and a quantity of overlapping between the adjacent two tubular light sources in the sub-scanning direction is N, the following relationship:

$$0.25 < N/D \leq 1.0$$

is satisfied.

2. An original illuminating apparatus according to claim 1, wherein for the plurality of tubular light sources, an arbitrary two or more light sources or all of the light sources are made to emit light simultaneously to illuminate the original, which is placed on an original stage.

3. An original illuminating apparatus according to claim 1, wherein a light shielding plate is arranged so as to overlap a part of the tube diameter of at least one light source of the plurality of tubular light sources in the sub-scanning direction.

4. An original illuminating apparatus according to claim 1, wherein a reflecting plate for reflecting luminous flux from the plurality of tubular light sources to the image information side is arranged across the reading optical axis from the plurality of tubular light sources.

5. An original illuminating apparatus according to claim 1, wherein a reflecting plate for reflecting luminous flux from the plurality of tubular light sources to the image information side is arranged across the plurality of tubular light sources from the reading optical axis.

6. An original illuminating apparatus according to claim 1, wherein all of the plurality of tubular light sources are arranged on one side with respect to the reading optical axis.

7. An original illuminating apparatus, for use in an image reading apparatus to illuminate image information on an original, wherein the image information is imaged on reading means through a reading optical system, and wherein a sub-scanning direction in the image reading apparatus is a direction along which the reading means moves relative to the original, and a main scanning direction is a direction perpendicular to the sub-scanning direction and to a reading optical axis of the reading optical system, the apparatus comprising:

a plurality of tubular light sources extending in the main scanning direction, wherein the plurality of tubular light sources are arranged in a direction of the reading optical axis such that, when viewed from a direction parallel to the reading optical axis, tube diameters of said tubular light sources overlap one another in a sub-scanning direction, and wherein a light shielding plate is arranged so as to overlap the tube diameter of at least one light source of the plurality of tubular light sources in the sub-scanning direction, further comprising an original stage on which an original as the image information is to be placed, wherein when of the plurality of tubular light sources, the tube diameter of the tubular light source closest to the original stage in the reading optical axis is D, and a quantity of overlapping between the tubular light source concerned and the light blocking plate in the sub-scanning direction is L, the following relationship:

$$0.25 < L/D \leq 1.0$$

is satisfied.

8. An image reader, comprising:

the original illuminating apparatus according to either one of claim 1 or 7; and a controller adapted to communicate with an external apparatus through an interface.

* * * * *

UNITED STATES PATENT AND TRADEMARK OFFICE
CERTIFICATE OF CORRECTION

| | | |
|---|---|---|
| PATENT NO. | : 7,021,541 B2 | Page 1 of 1 |
| APPLICATION NO. | : 10/330267 | |
| DATED | : April 4, 2006 | |
| INVENTOR(S) | : Tadao Hayashide | |

It is certified that error appears in the above-identified patent and that said Letters Patent is hereby corrected as shown below:

<u>COLUMN 1</u>

Line 52, "almost" should read --most--.

<u>COLUMN 2</u>

Line 11, "Almost" should read --Most--; and
Line 67, "much" should read --large--.

Signed and Sealed this

Third Day of October, 2006

JON W. DUDAS
*Director of the United States Patent and Trademark Office*